United States Patent Office 3,367,459
Patented Feb. 6, 1968

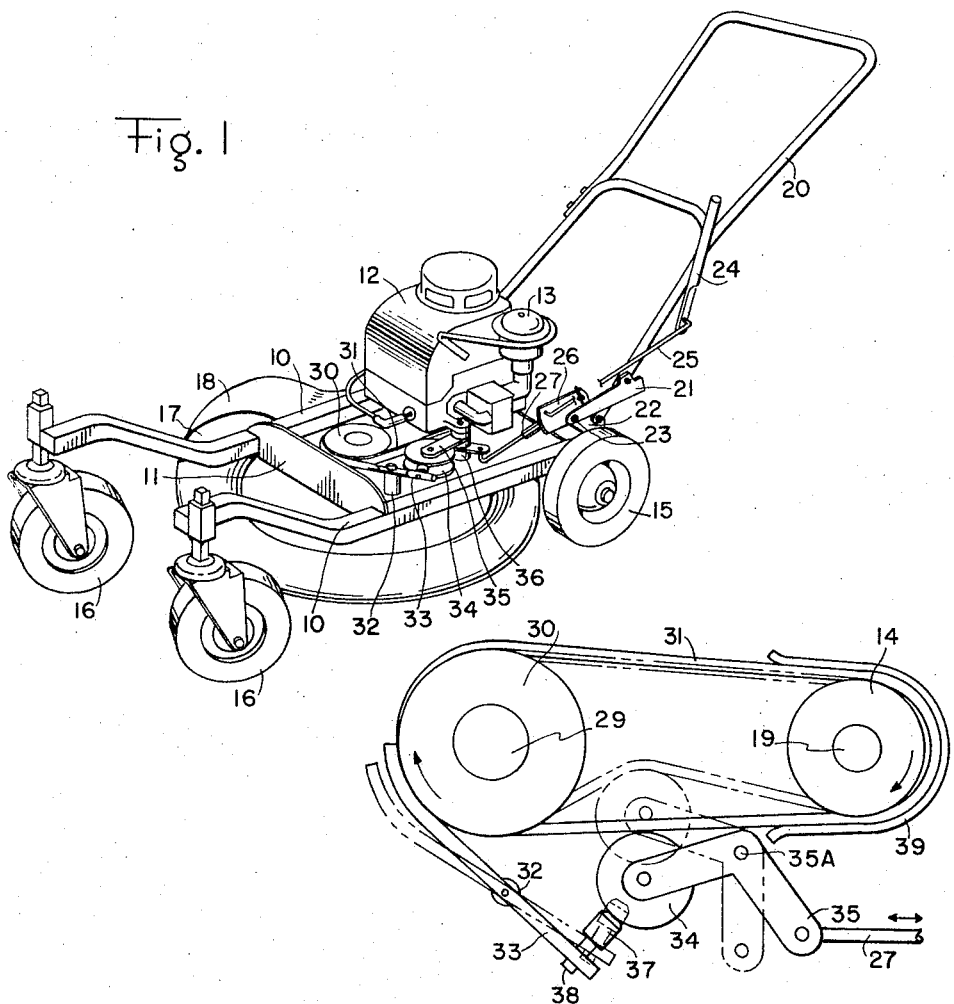

3,367,459
BELT TIGHTNER AND BRAKE FOR MOWER
Robert M. Rubin, Minneapolis, Minn., assignor to Toro Manufacturing Corporation, Minneapolis, Minn., a corporation of Minnesota
Filed May 28, 1965, Ser. No. 459,770
8 Claims. (Cl. 192—11)

ABSTRACT OF THE DISCLOSURE

The combination of a belt tightener and a pulley brake which is moved into braking relationship with the driven pulley by the movement of the belt tightener to belt loosening and drive disconnecting position.

---

This invention relates to cutter braking mechanism for power driven mowers, particularly those of the rotary type, although the scope of the invention is not necessarily limited thereto.

In operating rotary power mowers, it is desirable for safety purposes to stop the rotation of the cutter blade as quickly as possible after cutting is discontinued. However, due to the high speed of rotation and momentum of the blade when driven, the blade continues to rotate for an undesirably long period of time after power has ceased to be applied thereto. Also, during use, it is oftentimes desirable for safety purposes to stop the rotation of the blade without stopping the engine, such as when the operator must approach the mower to make certain adjustments, when the mower is approached by some other party who might come close enough to be endangered by the rotating blade, or when the operator must leave the mower temporarily unattended. Therefore, it is desirable for the operator to be able to disengage the cutter from the source of power, in which situation the continued rotation of the blade after driving thereof is particularly dangerously prolonged.

Therefore, one important object of this invention is to provide a power mower having means for quickly and conveniently disengaging the cutter from the engine and braking the blade after disengagement so that the blade can be brought to a quick stop without discontinuing the operation of the engine.

Still another important object is to provide novel brake means for bringing the cutter to a complete stop very quickly immediately after power ceases to be applied to the cutter.

Still another object is to provide a cutter control mechanism for disengaging the cutter and engine and braking the cutter in which the clutch mechanism and brake mechanism are operatively related to each other so that the clutch and brake mechanism can be operated simultaneously by the mower operator by the manipulation of a single control element.

Still another object is to provide a mower having a disengageable drive belt system connecting the cutter and source of power and cutter brake mechanism which brakingly engages said drive belt when drivingly disengaged and which also serves to retain the belt on the cutter pulley while so disengaged.

These and other objects will be more fully understood from the following description and accompanying drawings in which:

FIGURE 1 is a perspective view of a rotary power mower embodying one form of this invention, FIGURE 2 is a top plan view of the essential portions of the cutter clutch and brake mechanism of the mower of FIGURE 1, and FIGURE 3 is a top plan view of the essential portions of another cutter clutch and brake mechanism constituting an alternate form of this invention.

The motor shown in FIGURE 1 includes a pair of laterally spaced apart elongate longitudinally extending frame members 10, which provide the basic support for the entire mower. An upstanding transverse panel 11 extends between the frame members 10 and forms the front part of a protective shroud for covering the clutch and brake mechanism hereinafter described, the remainder of said shroud having been removed for clarity of illustration. An engine 12 having an air cleaner 13 is mounted atop the mower frame, said engine driving a vertical drive shaft 19 having a driver pulley 14 attached thereto. The mower is further provided with a pair of rear traction wheels 15 and a pair of front caster wheels 16. A cutter housing 17 having a deflector 18 mounted thereon overlying the discharge mouth of the housing is suspended beneath the frame members 10, said housing enclosing a cutter blade (not shown).

A steering handle 20 is provided, the lower ends of which are pivotally supported by upstanding brackets 22 mounted on each side of the rear of the frame. A handle latch 21 is pivotally connected to the bracket 22 at 23, and is adjustably attachable to the handle to hold same at the desired angle.

The cutter control mechanism of this invention includes a cutter control handle 24 which is pivotally mounted on the steering handle 20 within each reach of the operator. This cutter control handle 24 has a rod 25 pivotally connected to the lower end thereof, which rod 25 extends forwardly from the handle 24, the forward end of the rod 25 being pivotally connected to a bell crank lever 26, which bell crank is pivotally mounted on the aforementioned mounting bracket 22.

Longitudinally adjustable linkage is provided which extends between the bell crank 26 and the cutter clutch mechanism hereinafter described. This adjustable linkage is a control rod 27 which includes a sleeve having a pair of elongate rods threadedly engaged therewith and extending from opposite ends thereof. One of the rods is operatively connected to the bell crank 26, the other rod being pivotally and operatively connected to cutter clutch mechanism.

The cutter blade is attached to and driven by a vertical drive shaft 29 which extends upwardly through the housing 17 and has a driven pulley 30 attached to the upper end thereof.

To transmit driving power from the engine to the cutter blade, an endless flexible drive belt 31 is provided which is trained about and drivingly interconnects the pulleys 14 and 30.

The drive belt is of such length that unless tensioned by suitable means, it is sufficiently slack when untensioned so as to drivingly disengage the cutter from the engine.

To tension or slacken the drive belt 31 to respectively engage or disengage the cutter and engine, belt tensioning or tightening means in the form of an idler pulley 34 adapted to engage said belt is provided. The idler pulley 34 is rotatably mounted on one leg of a bell crank lever 35, which bell crank is pivotally attached to the mower frame as at 35a. The other leg of the bell crank 35 is pivotally attached to the forward end of the adjustable control rod 27 and operated thereby. Thus, by suitable manipulation of the cutter control handle 24, and the linkage connecting said handle with the bell crank 35, the idler is swung between drive engaging and drive disengaging position. To drivingly engage the cutter and the engine, the idler is swung from the solid line disengaged position of FIGURE 2 inwardly against the drive belt 31 to tighten same and thereby engage the cutter and engine, the idler, bell crank and belt assuming the broken line engaged positions of FIGURE 2.

The cutter blade will continue to rotate in a free wheeling fashion for quite some time after disengagement from the engine and it is therefore desirable for safety purposes to bring the blade to a complete stop as quickly as possible after disengagement from the engine. To accomplish this, a brake arm 33 is provided which is pivotally mounted on supporting bearing 32, the outer end of the brake arm being curved to substantially the same curvature as the pulley 30. The brake arm 33 is so positioned that it can be swung into and out of braking engagement with the cutter mechanism. In the illustrated embodiment, the brake arm is adapted to engage and press against the drive belt 31 and in turn press same against the pulley 30 to accomplish the braking action on the cutter. The rearward end of the brake arm 33 is provided with a bumper or stop member 37 which extends laterally therefrom and is affixed thereto by means of shank 38. The bumper 37 is so positioned as to be engaged by the idler 34 after the idler has been swung outwardly to a position in which the drive belt is slackened and the cutter and engine are disengaged. As the idler 34 swings outwardly from drive engagement position, and after it has disengaged the drive, it engages and bears against the bumper 37, thereby causing the curved forward end of the brake arm to swing inwardly to the solid line operative position of FIGURE 2 and press against the drive belt 31 and press same against the pulley 30 with sufficient pressure to bring the cutter to an almost instantaneous stop. The brake arm is held in the cutter braking position by the idler 34 until such time as the cutter and engine are again engaged by moving the idler inwardly against the belt. When the idler moves from drive disengagement to drive engagement position, it releases the brake arm prior to re-engaging the drive, and the brake arm will swing outwardly to an inoperative position such as that illustrated by the broken line position of FIGURE 2 so as not to interfere with the driving of the cutter. During the time that the brake arm is maintained in the braking position by the idler pulley, it serves the additional purpose or function of serving as a belt retainer for holding the belt in suitable position on the pulley 30, working in conjunction with another belt retainer 39 provided to hold the belt on the pulley 14 when the belt is slack and disengaged. The brake supporting bearing 32 is preferably adjustably mounted on the mower by any suitable means to enable the position of the brake arm to be adjusted relative to the cutter pulley 30 so that the curved portion of the brake arm can be properly fitted to the contour of the belt on the pulley.

Thus, during use, the cutter and engine can be engaged and disengaged by the simple manipulation of the control handle 24 by the operator, the manipulation of said handle also simultaneously controlling the actuation of the cutter brake mechanism. With the cutter and engine disengaged, the braking mechanism is in operative condition. To drive the cutter and release the cutter brake, the operator simply pushes the handle 24 forward. The intermediate control linkage including the rod 25, bell crank 26 and adjustable control rod 27 thereupon actuates the bell crank 35 and pushes same forwardly and causes the idler pulley 34 to swing inwardly against the drive belt 31 and tighten same sufficiently to effect a driving connection between the driving pulley 14 and the driven cutter pulley 30. As soon as the idler pulley 34 moves inwardly away from the bumper 37, the brake arm 33 is thereupon released and swings outwardly out of engagement with the drive belt and cutter mechanism. When the operator desires to disengage the cutter and stop same, the operator simply pulls the handle 24 rearwardly. This movement of the cutter control handle through the medium of the aforementioned intermediate linkage pulls the bell crank 35 rearwardly, and causes the idler pulley 34 to swing outwardly away from the drive belt 31 so as to slacken same sufficiently to drivingly disengage the cutter and engine. When the idler pulley 34 has moved to a position whereby the cutter and engine are disengaged, the continued movement of the pulley causes it to engage the bumper 37 and press against same thereby pushing the rear of the brake arm 33 outwardly and pressing the forward curved end of the brake arm into engagement with the belt 31 so as to press same into braking engagement with the pulley 30 and bring the cutter to an almost instantaneous stop. This engagement of the brake arm with the belt will hold the slackened belt in proper position on the pulley 30 until such time as the engine and cutter are re-engaged and the brake arm is released by the idler.

The form of the invention illustrated in FIGURE 3 is an alternate form of clutch and brake mechanism which can be used with the mower of FIGURE 1 in place of the clutch and brake mechanism illustrated in FIGURE 2 and hereinbefore described. In FIGURE 3 are shown a driven cutter pulley 40 and a driving pulley 41 which are drivingly engaged by a belt 43 trained thereabout. A belt retainer 42 is provided to hold the belt on the pulley 41 when the belt is slack and the cutter and engine are disengaged. A bell crank lever 44 is provided which is pivotally attached to the supporting frame as at 45. The rear leg of the lever 44 is operatively connected to the control rod 27 as illustrated. The forward leg of the lever 44 has an idler pulley 47 rotatably mounted thereon, which idler pulley is adapted to move into and out of engagement with the belt 43 to tighten and slacken same in response to swinging movement of the lever 44 and thereby respectively drivingly engage and disengage the cutter and engine. It will be noted that in this form of the invention the idler pulley is positioned inside the drive belt rather than outside as in the form illustrated in FIGURE 2. The forward leg of lever 44 is also provided with a bracket 46 which serves to support and brace an elongate brake arm 48, the rear end of which is attached to the forward leg of the lever 44, the forward end of the brake arm 48 being curved to the approximate curvature of the pulley 40 and is adapted to engage the belt 43 and press same against the pulley 40 to brake the cutter mechanism and bring same to a stop. Thus, in this form of the invention, the idler and the brake arm are both directly connected to the bell crank lever 44 so that their movements are simultaneous therewith. In FIGURE 3, the solid line positions illustrate the position of the clutch mechanism when the cutter and engine are disengaged and the position of the cutter brake when it is operatively engaged with the cutter mechanism. The broken line positions of FIGURE 3 show the position of the clutch mechanism when the cutter and engine are drivingly engaged and the brake mechanism is in an inoperative position. Thus, it can be readily seen from FIGURE 3 that by pulling rearwardly on the rear leg of the lever 44, the idler 47 is swung outwardly so as to bring it into engagement with the drive belt 43 and push same outwardly to a point where it provides driving engagement between the pulleys 40 and 41. The outward swinging movement of the forward leg of the lever 44 causes the brake arm 48 to move simultaneously therewith, out of engagement with the belt 43, the disengagement of the brake arm 48 and belt 43 occurring before the idler has tensioned the belt to a point where there is a driving engagement between the cutter and the engine. To disengage and brake the cutter, the rear leg of the lever 44 is simply pushed forwardly from the broken line position to the solid line position of FIGURE 3, which movement causes the forward leg of the lever to swing inwardly, carrying with it the idler 47 from the broken line to the solid line position of FIGURE 3 which effects the disengagement of the drive. This movement of the forward leg of lever 44 also causes it to carry the brake arm 48 from the broken line inoperative position of FIGURE 3 to the solid line operative position of FIGURE 3 and into braking engagement with the drive belt and pulley 40, it being understood that the various parts are so related and positioned that the brake arm 48 does not engage the drive belt until after disengagement of the drive has been completed. The brake arm 48 also serves as a belt retainer to hold the belt on the pulley 40 when the drive is disengaged. Because idler 47 is positioned inside the drive belt instead of outside as is idler 34, the actuating movements of lever 44 are the reverse of the actuating movements of lever 35, and therefore the lever actuating mechanism of FIGURE 1 must be adjusted to effect this reverse movement when the clutch and brake mechanism of FIGURE 3 is substituted for that of FIGURE 2 in the mower of FIGURE 1.

The braking pressure of the brake arms 33 and 48, on their respective belts, is controlled by adjusting the length of control rod 27. For brake arm 33, pressure is decreased by lengthening control rod 27 and pressure is increased by shortening control rod 27. For brake arm 48, its pressure is increased by lengthening control 27 and its pressure is decreased by shortening control rod 27.

From the foregoing, the advantages of this invention are readily apparent. By means of this invention, a simple clutch mechanism is provided for engaging and disengaging the cutter to deactivate same without having to stop the engine. The cutter brake mechanism enables the cutter blade to be brought to an almost instantaneous stop almost immediately after disengagement of the cutter from the engine so that there will be no dangerous free wheeling rotation of the cutter after disengagement which might prove hazardous to persons standing nearby. Also, by making the brake mechanism responsive to the movements of the clutch mechanism, the clutching and the braking can be simultaneously accomplished by the mower operator by a single manipulation of the cutter control handle, which is conveniently available to him from his normal operational stance behind the mower.

It will, of course, be understood that various changes may be made in the form, details, arrangement and proportion of the various parts without departing from the scope of my invention.

What I claim is:

1. In a power transmission system, the combination comprising:
    a pulley,
    a belt trained about said pulley,
    mechanism for selectively tightening and loosening said belt including a pivotally mounted idler arm and a belt engaging idler element carried thereby movable between belt tightening and belt loosening positions in response to the pivotal movement of said idler arm,
    and a pivotally mounted brake arm adopted to apply braking pressure to said pulley and swingable between braking and non-braking positions,
    said brake arm pivoting about an axis different from the pivot axis of said idler arm and moved from non-braking to braking position by movement of said idler element from belt tightening to belt loosening position.

2. In a power transmission system, the combination comprising:
    a pulley,
    a belt trained about said pulley,
    mechanism for selectively tightening and loosening said belt including a pivotally mounted idler arm and a belt engaging idler element carried thereby movable between belt tightening and belt loosening positions in response to the pivotal movement of said idler arm,
    and a pivotally mounted brake arm,
    the pivot axis of said brake arm being disposed intermediate the ends thereof thereby dividing said brake arm into first and second end portions disposed on opposite sides of said pivot axis,
    said first end portion being adapted to apply braking pressure to said pulley and swingable between braking and non-braking positions,
    and means connected with said idler arm adapted to apply pressure to said second end portion of said brake arm and thereby move said first end portion from non-braking to braking position in response to movement of said idler arm and element from belt tightening to belt loosening position.

3. The combination of claim 2, wherein said idler arm and brake arm have different pivot axes.

4. In a power transmission system, the combination comprising:
    a pulley,
    a belt trained about said pulley,
    mechanism for selectively tightening and loosening said belt including a pivotally mounted idler arm and a belt engaging idler element carried thereby movable between belt tightening and belt loosening positions in response to the pivotal movement of said idler arm,
    and a pivotally mounted brake arm adapted to apply braking pressure to said pulley and swingable between braking and non-braking positions,
    said brake arm being engageable by said idler element and moved thereby from non-braking to braking position by the movement of said ilder element from belt tightening to belt loosening position.

5. The combination of claim 4, including a bumper element carried by said brake arm extending towards said idler element and engaged thereby in braking position.

6. In a power transmission system, the combination comprising:
    a pulley,
    a belt trained about said pulley,
    mechanism for selectively tightening and loosening said belt including a belt crank idler arm having an idler wheel mounted on one leg thereof and actuating means connected to the other leg thereof,
    a brake arm pivotable about an axis different from the pivot axis of said idler arm and having first and second end portions disposed on opposite sides of its pivot axis,
    said first end portion being swingable between braking and non-braking positions and when in said braking position engaging said belt and pressing same against said pulley to brake same,
    said second end portion being engageable by said idler wheel as said wheel moves from belt tightening to belt loosening position to thereby move said first end portion into braking relationship with said pulley.

7. The combination of claim 6, including a bumper element carried by the second portion of said brake arm and extending towards said idler wheel and engaged thereby in braking position.

8. In a power transmission system, the combination comprising:
    a pulley,
    a belt trained about said pulley,
    mechanism for selectively tightening and loosening said belt including a pivotable idler arm having a pivot axis intermediate its ends dividing same into first and second end portions disposed on opposite sides of said axis,
    a belt engaging idler element carried by said first end portion,
    actuating means connected to said second end portion,
    a pivotally mounted brake arm,
    the pivot axis of said brake arm being disposed intermediate the ends thereof thereby dividing said brake arm into first and second end portions disposed on opposite sides of the brake arm pivot axis,
    said first end portion of said brake arm being adapted to apply braking pressure to said pulley and swingable between braking and non-braking positions,
    and means connected with said first end portion of said idler arm adapted to apply pressure to said second end portion of said brake arm and thereby move said first end portion of said brake arm from nonbraking to braking position in response to movement of said idler arm and element from belt tightening to belt loosening position.

References Cited

UNITED STATES PATENTS

| | | | |
|---|---|---|---|
| 993,317 | 5/1911 | Rockstroh | 192—11 |
| 1,301,849 | 4/1919 | Jones | 192—11 |
| 1,727,933 | 9/1929 | Mitchell | 192—11 |
| 2,306,755 | 12/1942 | Ronning | 192—11 |
| 2,957,561 | 10/1960 | Musgrave | 192—11 |
| 2,985,992 | 5/1961 | Dowdle | 56—25.4 |
| 3,026,665 | 3/1962 | Hoff | 56—25.4 |

BENJAMIN W. WYCHE III, *Primary Examiner.*

DAVID J. WILLIAMOWSKY, *Examiner.*